United States Patent
Otsuka

(10) Patent No.: US 7,213,463 B2
(45) Date of Patent: May 8, 2007

(54) PRESSURE SENSOR HAVING LIQUID IN A PRESSURE SENSING CHAMBER

(75) Inventor: Takeshi Otsuka, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/070,277

(22) Filed: Mar. 3, 2005

(65) Prior Publication Data
US 2005/0193825 A1    Sep. 8, 2005

(30) Foreign Application Priority Data
Mar. 4, 2004  (JP)  ............... 2004-60732

(51) Int. Cl.
  *G01L 7/08*  (2006.01)
(52) U.S. Cl. .............. 73/715; 73/717; 73/753; 73/756
(58) Field of Classification Search ........... 73/700–756
  See application file for complete search history.

(56) References Cited

U.S. PATENT DOCUMENTS

| 4,894,698 A | * | 1/1990 | Hijikigawa et al. | ......... 257/254 |
| 5,436,491 A | * | 7/1995 | Hase et al. | ................. 257/417 |
| 6,167,761 B1 | * | 1/2001 | Hanzawa et al. | ............. 73/724 |
| 6,465,271 B1 | * | 10/2002 | Ko et al. | ...................... 438/48 |
| 6,877,383 B2 | * | 4/2005 | Horie et al. | .................. 73/754 |

FOREIGN PATENT DOCUMENTS

JP    A-2002-98607    4/2002

OTHER PUBLICATIONS

First Office Action from Chinese Patent Office issued on Dec. 15, 2006 for the corresponding Chinese patent application No. 200510052996.1 (a copy and English translation thereof).

* cited by examiner

*Primary Examiner*—Edward Lefkowitz
*Assistant Examiner*—Jermaine Jenkins
(74) *Attorney, Agent, or Firm*—Posz Law Group, PLC

(57) ABSTRACT

A pressure sensor includes a sensor chip, a pressure receiving diaphragm, a connector case, and a case. A pressure sensing chamber is provide in the connector case and filled with oil. The sensor chip is arranged in the chamber and the diaphragm is fixed to the connector case such that it has contact with the oil and seals the chamber. An O-ring and a welding ring are placed around an edge of the diaphragm and the chamber between the diaphragm and the connector case. The diaphragm is fixed to the connector case via the O-ring and the welding ring and fixed. An inner portion of the welding ring is formed such that it can be placed between the sensor chip, wires, and the diaphragm in the chamber.

8 Claims, 5 Drawing Sheets

PRESSURE

FIG. 8 <u>PRIOR ART</u>
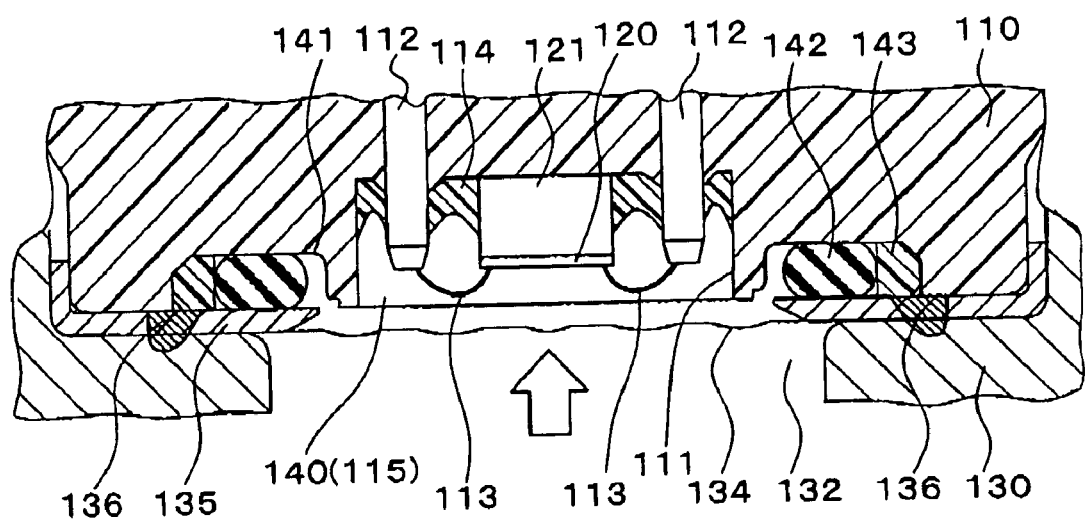

PRESSURE SENSOR HAVING LIQUID IN A PRESSURE SENSING CHAMBER

CROSS REFERENCE TO RELATED APPLICATION

This application is based on and incorporates herein by reference Japanese Patent Application No. 2004-60732 filed on Mar. 4, 2004.

FIELD OF THE INVENTION

The present invention relates to a pressure sensor having liquid in a pressure sensing chamber.

BACKGROUND OF THE INVENTION

A pressure sensor having liquid in a pressure sensing chamber as a pressure transmitting member is proposed in JP-A-2002-98607. The pressure sensor has a case in which the sensing chamber is provided. A pressure sensing element is arranged in the sensing chamber and a diaphragm is fixed to the case such that it covers an opening the pressure sensing chamber.

A cross-sectional view around the sending chamber is shown in FIG. 8. A first case 110 has a recess 111, a space of which is used as a sensing chamber 140. Liquid 115 that is a pressure transmitting member, such as oil, is confined in the sensing chamber 140. A metal diaphragm 134 for receiving pressure is fixed to the first case 110 such that it seals the sensing chamber 140 and has contact with the liquid 115. The diaphragm 134 receives pressure applied in the direction indicated with a white arrow.

A pressure sensing element 120 is arranged in the sensing chamber 140 such that it receives pressure from the liquid 115. The pressure received by the diaphragm 134 is transmitted to the sensing element 120 via the liquid 115. The sensing element 120 is electrically connected with terminals 112 via wires 113. The sensing element 120 outputs signals according to levels of pressure applied by the liquid 115 and the signals are transmitted to an external device via the wires 113 and the terminals 112.

An O-ring 142 and a welding ring 135 arranged around the sensing chamber 140 between the diaphragm 134 and the first case 110. The O-ring 142 is placed adjacent to the first case 110. It seals the sensing chamber 140. The welding ring 135 is a holding member for supporting the diaphragm 134, which is thin and requires a support. The diaphragm 134 and the welding ling 135 are welded to a second case 130 having a pressure intake hole 132. The second case 130 is fixed integrated to the first case 110 by swaging. The diaphragm 134 is pressed against the first case 110 via the O-ring 142 and the welding ring 135 with a force applied when the second case 130 is swaged fixed to the first case 110. As a result, the sensing chamber 140 is sealed.

The liquid 115 may leak when the O-ring 142 is damaged, the O-ring 142 is not tightly fitted due to faulty swaging, or welding of the diaphragm 134 or the welding ring 135 is not properly welded. It may leak when sealing surfaces of the diaphragm 134, the O-ring 142, the welding ring 135 are rough or have scars, burrs, or dents. It may leak when foreign substances are present in the sealing areas. It may leak through a gap between the first case 110 and the terminal 112 when a sealant 114 that seals the gap is broken or removed.

The diaphragm 134 becomes freely movable when the liquid has leaked. As a result, the diaphragm 134 moves toward the sensing element 120 and the wires 113 when a high level of pressure is applied to the diaphragm 134 though the pressure intake hole 132. The diaphragm 134, the sensing element 120, and the wires 113 are electrically shorted at the worst case. The diaphragm 134 a thin plate and therefore it is not steady. Moreover, it is an electric conductor. Thus, electrical shortage occurs among the diaphragm 134, the sensing element 120, and the wires 113.

SUMMARY OF THE INVENTION

The present invention therefore has an objective to provide a pressure sensor in which electrical shortage is less likely to be produced among a pressure receiving diaphragm, a pressure sensing element, and a connecting member. A pressure sensor of the present invention includes a case, a pressure receiving metal diaphragm, a pressure sensing element, an O-ring, and a welding ring.

The case has a pressure sensing chamber in which liquid is confined. The pressure receiving metal diaphragm has contact with the liquid and seals the pressure sensing chamber. The pressure sensing element to which a connecting member for electrical connection is attached is arranged in the pressure sensing chamber in a position that pressure from the liquid is receivable. The O-ring is arranged around an edge of the diaphragm and the pressure sensing chamber between the diaphragm and the case. The welding ring is arranged around the edge of the diaphragm and the pressure sensing chamber between the diaphragm and the case more adjacent to the diaphragm than the O-ring.

The diaphragm is fixed to the case via the O-ring and the welding ring. The welding ring has a hole formed such that an inner portion thereof is placed between the pressure sensing element, the connecting member, and the diaphragm in the pressure sensing chamber.

With the above configuration, the diaphragm touches the inner portion of the welding ring when high pressure is applied to the diaphragm and the diaphragm moves toward the pressure sensing element. As a result, the movement of the diaphragm is restricted, namely, excessive movement of the diaphragm is reduced. The diaphragm, the pressure sensing element, and the connecting member are less likely to be brought close within a distance that electrical shortage may occur. Thus, the electrical shortage is less likely to be produced even when a leakage of the oil occurs.

BRIEF DESCRIPTION OF THE DRAWINGS

The above and other objectives, features and advantages of the present invention will become more apparent from the following detailed description made with reference to the accompanying drawings. In the drawings:

FIG. 8 is a cross-sectional view around a pressure sensing chamber of a pressure sensor according to a related art.

DETAILED DESCRIPTION OF THE PREFERRED EMBODIMENT

Figure 1:
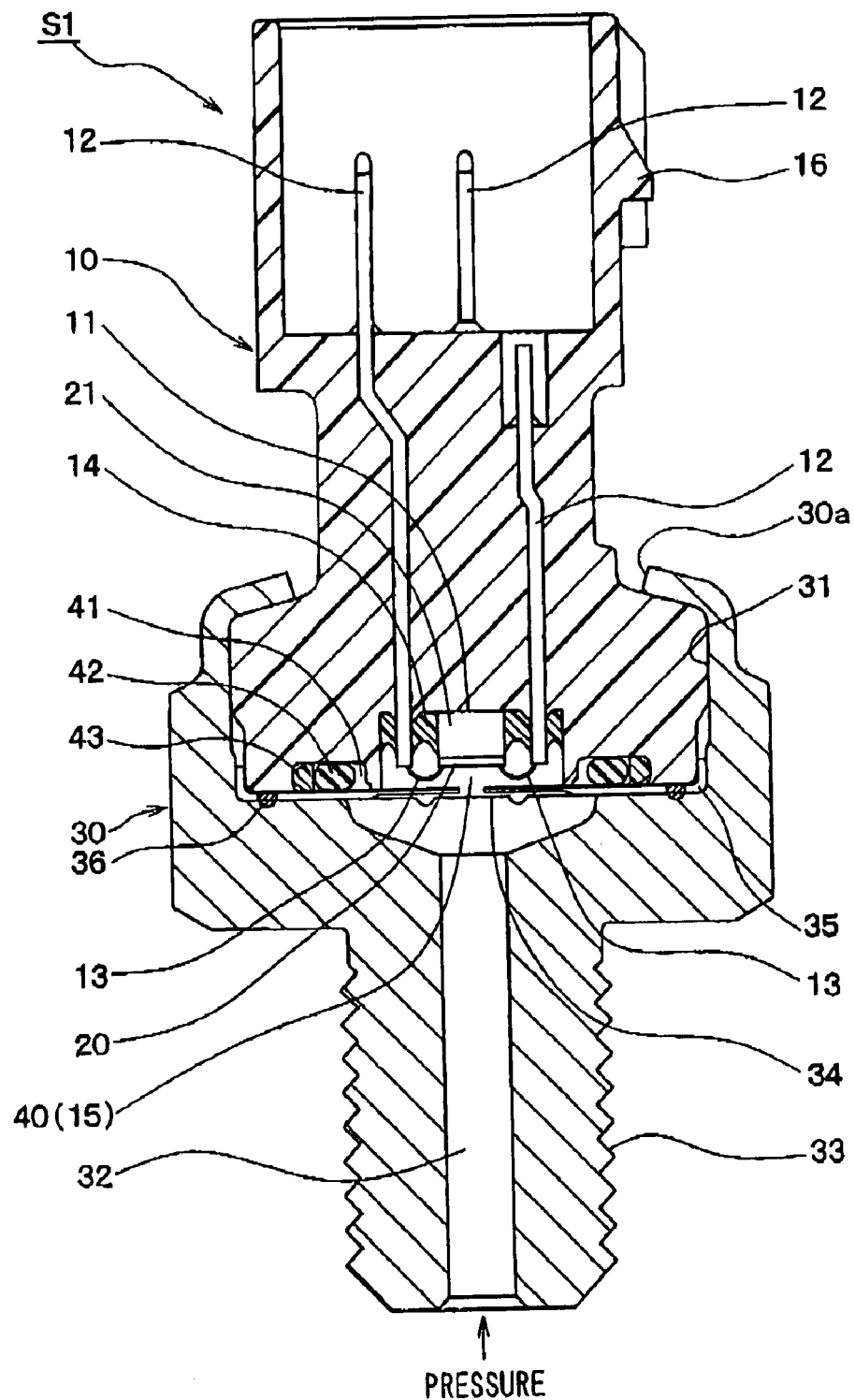
FIG. 1 is a cross-sectional view of a pressure sensor according to the first embodiment of the present invention.

The preferred embodiments of the present invention will be explained with reference to the accompanying drawings. In the drawings, the same numerals are used for the same components and devices.

[First Embodiment]

A pressure sensor S1 is shown in FIG. 1. The pressure sensor S1 is installed in a vehicle and used for detecting pressure levels of air conditioner coolant or fuel injection pressure.

The pressure sensor S1 has a connector case 10 and a case 30 integrated in one unit. The connector case 10 is a first case and the case 30 is a second case. The connector case 10 is made of resin, such as polyphenylene sulfide (PPS) or polybutylene terephthalate (PBT). It formed substantially in a cylinder. A recess 11 is formed in the connector case 10 at the first end of the connector case 10, which is a lower end in FIG. 1.

A sensor chip 20, which is a pressure sensing element, is arranged in the recess 11. The sensor chip 20 is a diaphragm type semiconductor sensor chip having a diaphragm (not shown) as a pressure receiving surface and converts pressure received by the diaphragm to electrical signals. Then, it outputs the electrical signals as sensor signals. The sensor chip 20 is integrated to a glass base 21 by anodic bonding. It is mounted to the connector case 10 by bonding the base 21 to the bottom of the recess 11.

The connector case 10 has metal rod terminals, or connector pins, 12 for electrically connecting the sensor chip 20 to an external circuit. The terminals 12 is prepared by plating nickel to brass pins and held in the connector case 10. The terminals 12 are integrally provided with the connector case 10 by insert molding. The first end of each terminal 12, which is a lower end in FIG. 1, is penetrated through the bottom of the recess 11 at positions near the sensor chip mounted area.

The tips of the first ends of the terminals 12 and the sensor chip are connected with each other via wires 13, which are made of gold or aluminum and the terminal 12 and the sensor chip 20 are electrically connected. The wires 13 are connecting members for electrically connecting the sensor chip 20 with the terminals 12. Gaps between the connector case 10 and the terminals 12 created by the penetration of the terminals 12 are sealed with sealant 14. The sealant is made of a silicon resin.

The recess 11 is filled with fluorine oil 15 such that the sensor chip 20 and the terminals 12, wires 13, and the sealant 14 are dipped in the oil 15. The oil 15 functions as a pressure transmitting member.

A connector portion 16 is formed at the second end of the connector case 10, which is an upper end in FIG. 1 for connecting the second end of the terminals 12 to the external circuit via wire harnesses (not shown). The external circuit is, for example, an electronic control unit of the vehicle.

Signal transmission between the sensor chip 20 and the external circuit are performed via the wires 13 and the terminals 12.

The case 30 is made of metal, such as stainless steel (SUS). The case has a well 31 at its first end, which is an upper end in FIG. 1, and a pressure intake hole 32 at its second end, which is a lower end in FIG. 1. Pressure is transmitted from the outside of the case 30 to the inside of the case 30 via the intake hole. The pressure is the air conditioner coolant pressure or the fuel injection pressure described previously.

A thread portion 33 is formed on a periphery of the case 30 at its second end. The pressure sensor S1 is mountable to an appropriate position in the vehicle, for instance, at a coolant pipe of an air conditioner or fuel pipe and fixed with the thread portion 33. The first end of the connector case 10 is inserted in the well 31 and the connector case 10 and the case 30 are assembled together such that the recess 11 is covered. An end portion 30a of the case 30 is swaged to the connector case 10 and the case 30 is secured to the connector case 10.

A pressure receiving diaphragm 34 and a welding ring 35 are arranged at the bottom of the well 31. The diaphragm 34 is made of metal, such as SUS, and formed in a circular plate. The welding ring 35 is made of metal, such as SUS, and arranged around the diaphragm 34.

The welding ring 35 is fixed such that it sandwiches the diaphragm 34 with the case 30. Namely, an edge of the diaphragm 34 is fixed to the case 30. The diaphragm stops the oil 15 from leaking and blocks a path between the recess 11 and the pressure intake hole 32. The welding ring 35 is thicker than the diaphragm 34, for instance, fifteen to twenty times thicker than the diaphragm 34. It configured as a holding member for supporting the thin diaphragm 34.

The edge of the diaphragm 34 is welded to the case 30 together with the welding ring 35 by laser welding. The diaphragm 34, the welding ring 35, and the case 30 are melted in part and form a welding portion 36. The connector case 10 and the case 30 are assembled in such a way, and the oil 15 is confined in a chamber defined by the recess 11 and the diaphragm 34. This chamber is a pressure sensing chamber 40.

In the pressure sensor S1, the connector case 10 has the pressure sensing chamber 40, in which the oil 15 is confined. The diaphragm 34 is fixed to the connector case 10 such that it has contact with the oil 15 and seals the pressure sensing chamber 40. The sensor chip 20 is arranged in the pressure sensing chamber at a position that the pressure from the oil 15 is receivable.

A circular O-ring groove is provided around the pressure sensing chamber 40. An O-ring 42 made of elastic materials, such as silicon rubber, is placed in the O-ring groove. The O-ring 42 is arranged and supported between the connector case 10 and the welding ring 35. The O-ring 42 is sandwiched by the connector case 10 and the welding ring 35 with pressure. As a result, the pressure sensing chamber 40 is sealed by the O-ring together with the diaphragm 34 and the oil 15 in the recess 11 is protected from leaking.

A backup ring 43 is also placed in the O-ring groove around the O-ring 42. The backup ring 43 is made of resin, such as tetrafluoroethylene. It protects the O-ring 42 from damage when the O-ring expands and slides into a gap between the connector case 10 and the welding ring 35.

The O-ring 42 and the welding ring 35 are placed around the edge of the diaphragm 34 and the pressure sensing chamber 40 between the diaphragm 34 and the connector case 10 in this order from the connector case side. Namely, the welding ring 35 is placed more adjacent to the diaphragm 34 than the O-ring 42. The diaphragm 34 is pressed against the connector case 10 via the O-ring 42 and the welding ring 35 and fixed.

Figure 2:
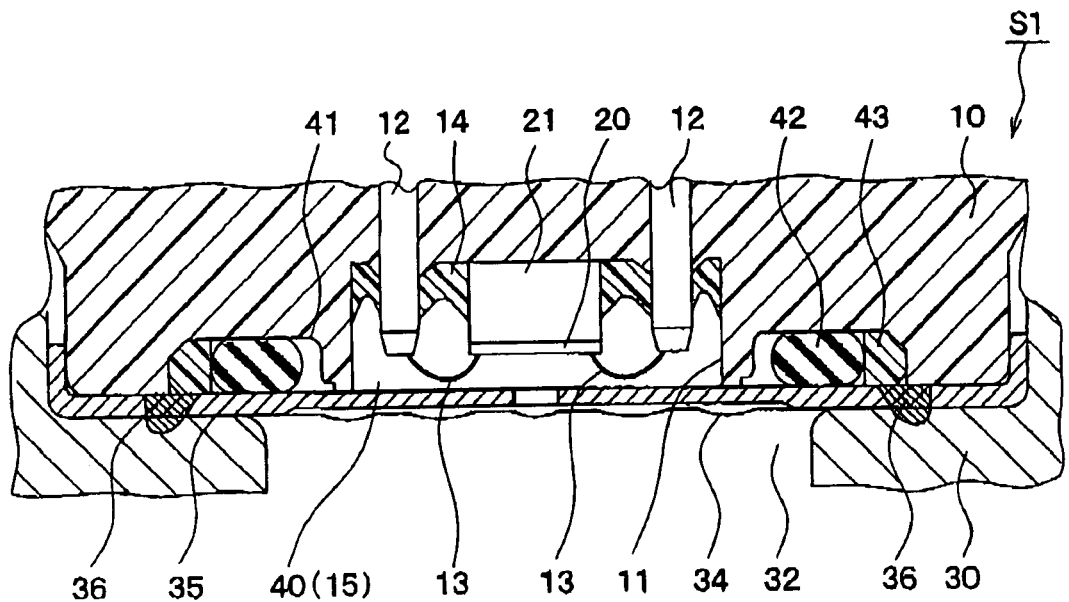
FIG. 2 is a cross-sectional view around a pressure sensing chamber of the pressure sensor according to the first embodiment.

Referring to FIG. 2, an inner portion of the welding ring 35 is formed such that it can be placed between the sensor chip 20, the wires 13, and the diaphragm 34 in the pressure sensing chamber 40. A hole of the welding ring 35 is formed with a diameter smaller than a diameter of the pressure sensing chamber, that is, the horizontal size of the welding ring hole is smaller than that of the pressure sensing chamber 40 in FIG. 2. The diameter of the welding ring hole is determined such that the inner portion of the welding ring 35 can be placed between the sensor chip 20, the wires 13, and the diaphragm 34 in the pressure sensing chamber 40. The welding ring 35 is produced by stamping or etching.

In the related art shown in FIG. 8, a hole of the welding ring 135 is formed with a diameter about equal to or larger than that of the pressure sensing chamber 140. More specifically, the hole diameter is about 9 mm. In this embodiment, the hole diameter is about 1 mm.

A method for assembling the pressure sensor S1 will be discussed. The connector case 10 in which the terminals 12 are assembled by insert molding is prepared. The sensor chip 20 is fixed inside the recess 11 via the base 21 with an adhesive made of silicon resin. The sealant 14 is injected into the recess 11 and cured after appropriately applied around each of the terminals 12. The wires 13 are bonded to the tips of the terminals 12 and the sensor chip 20 and the terminals 12 and the sensor chip 20 are connected with each other. The connector case 10 is placed in a position that the sensor chip 20 side is up. The predetermined amount of the oil 15 is poured from the top of the connector case 10 into the recess 11 with a dispenser.

The case 30 to which the diaphragm 34 and the welding ring are welded at the first end is prepared. The case 30 is placed right above the connector case and then moved toward the connector case 10 to engage it to the connector case 10 while it is leveled. The assembly in which the case 30 is engaged to the connector case 10 is placed in a vacuum room for removing the extra amount of air.

The connector case 10 is pressed against the case 30 until it has adequate contact with the welding ring 35 to prepare the pressure sensing chamber 40 sealed with the diaphragm 34 and the O-ring 42. The end portion 30a of the case 30 is swaged to the connector case 10 and the connector case 10 and the case are provided in a unit. The connector case 10 and the case 30 are fixedly assembled and the assembly of the pressure sensor S1 is completed.

A basic pressure sensing operation of the pressure sensor S1 will be discussed. The pressure sensor S1 is mounted to an appropriate position in the vehicle with the thread portion 33 of the case 30. External pressure, such as air conditioner coolant pressure and fuel injection pressure is transmitted inside the pressure sensor S1 via the pressure intake hole 32.

The pressure is applied to the diaphragm 34. The diaphragm 34 becomes stressed and deformed. The stress is transmitted to the sensor chip 20 via the oil 15 and the stress is applied to a pressure receiving surface of the sensor chip 20. The sensor chip 20 outputs a sensor signal, which is an electrical signal that corresponds to the applied pressure. The sensor signal is transmitted from the sensor chip 20 to the external circuit via the wires 13 and the terminals 12.

The pressure sensor S1 includes a connector case 10 having the pressure sensing chamber 40, the pressure receiving diaphragm 34, and the sensor chip 20. The pressure receiving diaphragm 34 has contact with the oil 15 and seals the chamber 40. The sensor chip 20 is arranged inside the chamber 40 at the position that the pressure from the oil 15 is receivable.

The O-ring 42 and the welding ring 35 are placed around the edge of the diaphragm 34 and the pressure sensing chamber 40 between the diaphragm 34 and the connector case 10 in this order from the connector case side. The diaphragm 34 is fixed to the connector case 10 via the O-ring 42 and the welding ring 35. The inner portion of the welding ring 35 is formed such that it can be placed between the sensor chip 20, the wires 13, and the diaphragm 34 in the pressure sensing chamber 40.

With the above configuration, the diaphragm 34 touches the inner portion of the welding ring 35 when high pressure is applied to the diaphragm 34 from the pressure intake hole side and the diaphragm 34 moves toward the sensor chip side. As a result, the movement of the diaphragm 34 is restricted, namely, excessive movement of the diaphragm 34 is reduced. The diaphragm 34, the sensor chip 20, and the wires 13 are less likely to be brought close within a distance that electrical shortage may occur.

The welding ring 35 has higher solidity than the diaphragm 34 because its thickness is larger than that of the diaphragm 34. The diaphragm 35 does move until it touches the sensor chip 20 or the wires 13 because it is held with the welding ring 35. Thus, the electrical shortage is less likely to be produced even when a leakage of the oil 15 occurs.

[Second Embodiment]

Figure 3:
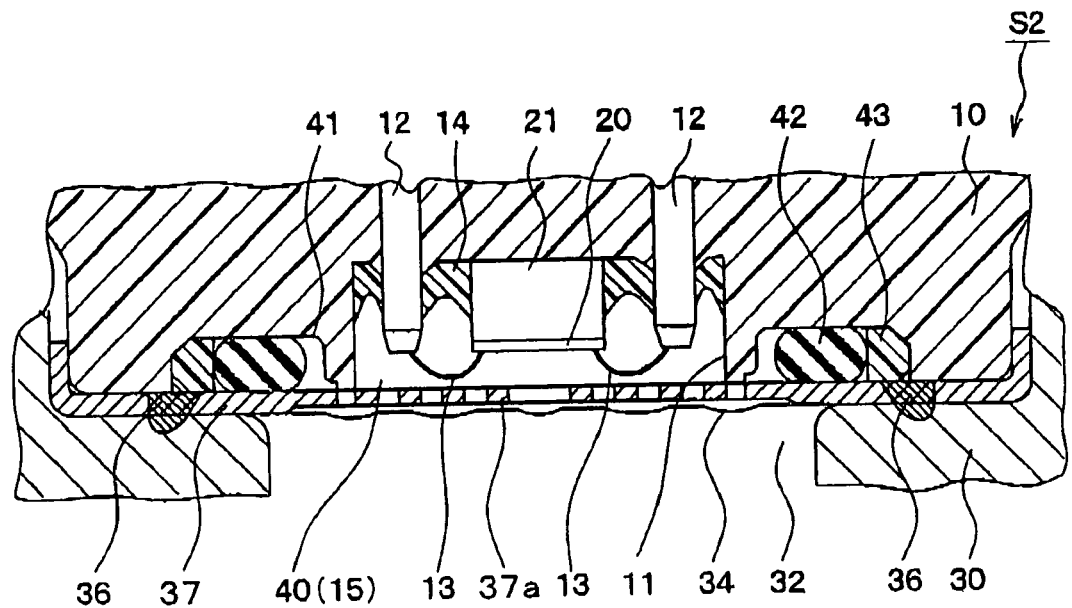
FIG. 3 is a cross-sectional view around a pressure sensing chamber of a pressure sensor according to the second embodiment of the present invention.

An enlarged view of a pressure sensor S2 around the pressure sensing chamber 40 is shown in FIG. 3. Configurations of the pressure sensor S2 that are different from the pressure sensor S1 will be discussed.

A mesh screen 35a is attached to the welding ring 37 to cover the hole. This type of welding ring 37 can be also easily produced by stamping or etching. The area of the welding ring 37 with the mesh screen 37a is placed in the pressure sensing chamber 40 between the sensor chip 20, the wires 13, and the diaphragm 34. Namely the inner portion of the welding ring 37 is placed in the chamber 40 between the sensor chip 20, the wires 13, and the diaphragm 34.

With this configuration, the diaphragm 34 touches the mesh screen 35a when the diaphragm 34 moves toward the sensor chip side. As a result, the movement of the diaphragm 34 is restricted. Namely, excessive movement of the diaphragm 34 is reduced. The diaphragm 34, the sensor chip 20, and the wires 13 are less likely to be brought close within a distance that electrical shortage may occur. Thus, the electrical shortage among the diaphragm 34, the sensor chip 20, and the wires 23 is less likely to be produced even when a leakage of the oil 15 occurs.

[Third Embodiment]

Figure 4:
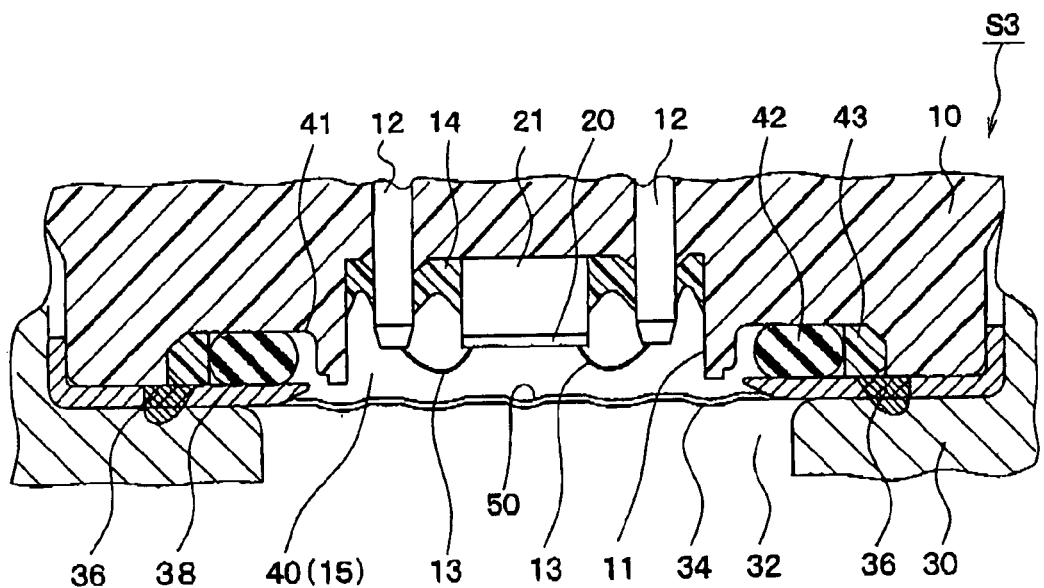
FIG. 4 is a cross-sectional view around a pressure sensing chamber of a pressure sensor according to the third embodiment of the present invention.

An enlarged view of a pressure sensor S3 around the pressure sensing chamber 40 is shown in FIG. 4. Configurations of the pressure sensor S3 that are different from the pressure sensors S1, S2 embodiment will be discussed.

The welding ring 38 does not have the inner portion that covers the pressure sensing chamber 40 as the welding rings 35 and 37 of the pressure sensors S1, S2 do. An insulator film 50 having electrical insulation is formed on a surface of the diaphragm 34 on the pressure sensing chamber side. The insulator film 50 can be any type of film as long as it is properly formed on the diaphragm 34 and stays on the diaphragm 34 even when the diaphragm 34 is deformed. For instance, an insulator material, such as parylene, is evaporated onto the diaphragm 34.

Electrical shortage among the diaphragm 34, the sensor chip 20, and the wires 13 is less likely to be produced because the diaphragm 34 is electrically insulated from the sensor chip 20 and the wires 13 by the insulator film 50. Thus, the electrical shortage among the diaphragm 34, the sensor chip 20, and the wires 23 is less likely to be produced even when a leakage of the oil 15 occurs.

[Fourth Embodiment]

Figure 5:
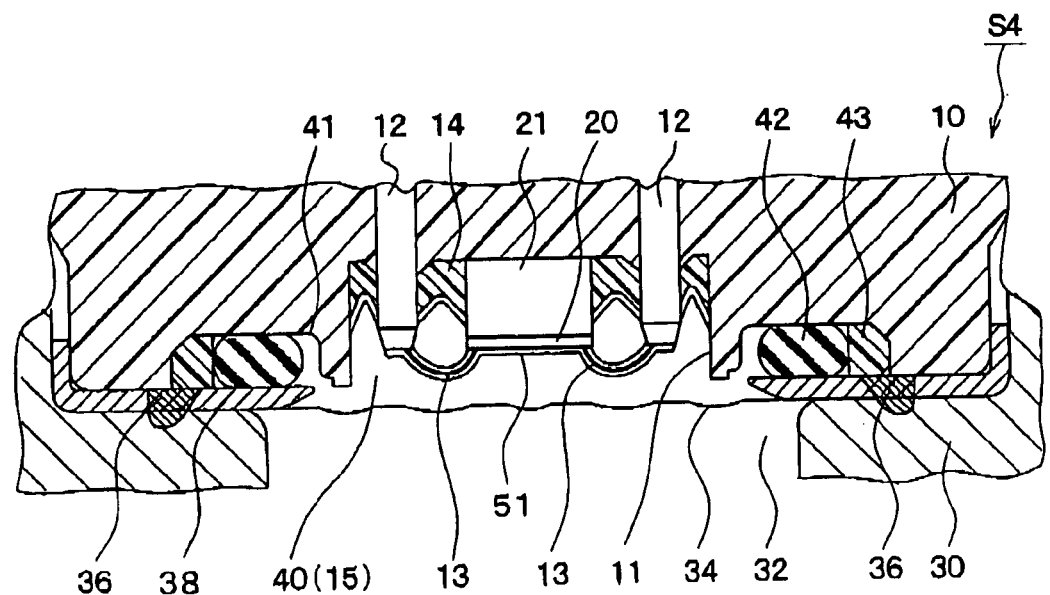
FIG. 5 is a cross-sectional view around a pressure sensing chamber of a pressure sensor according to the fourth embodiment of the present invention.

An enlarged view of a pressure sensor S4 around the pressure sensing chamber 40 is shown in FIG. 5. Configurations of the pressure sensor S4 that are different from the pressure sensors S1, S2, S3 will be discussed.

The welding ring 38 does not have the inner portion that covers the pressure sensing chamber 40 as the welding rings 35 and 37 of the pressure sensors S1, S2 do. Insulator films 51 having electrical insulation are formed on surfaces of the sensor chip 20 and the wires 13. The insulator films 51 can be any type of film as long as they are properly formed on the sensor chip 20 and the wires 13, and stay on them when the pressure sensor S4 is in use. For instance, insulator materials, such as parylene, are evaporated onto each of the sensor chip 20 and the wires 13.

The insulator films 51 are also formed on surfaces of the sealant 14 and the terminals 12. The insulator materials are evaporated onto them after the connection between the sensor chip 20 and the wires 13, and the application of the sealant 14 are completed.

Electrical shortage among the diaphragm 34, the sensor chip 20, and the wires 13 is less likely to be produced because the diaphragm 34 is electrically insulated from the sensor chip 20 and the wires 13 by the insulator films 51. Thus, the electrical shortage among the diaphragm 34, the sensor chip 20, and the wires 23 is less likely to be produced even when a leakage of the oil 15 occurs.

Figure 6:
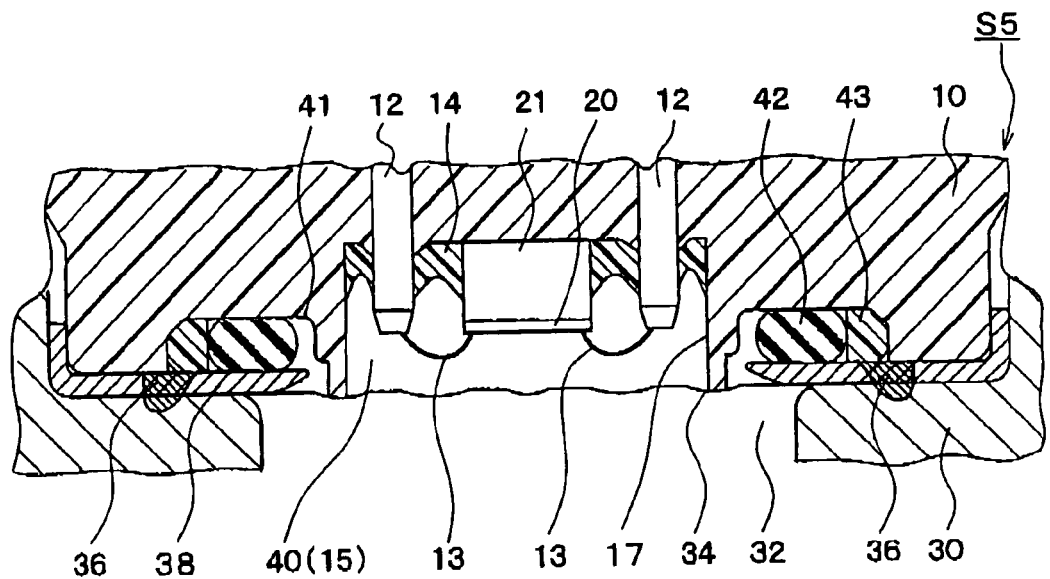
FIG. 6 is a cross-sectional view around a pressure sensing chamber of a pressure sensor according to a modified embodiment of the present invention.

The present invention should not be limited to the embodiment previously discussed and shown in the figures, but may be implemented in various ways without departing from the spirit of the invention. For example, side walls of the recess 11 may be formed higher than the pressure sensors S1, S2, S3, S5 as a recess 17 of a pressure sensor S5 shown in FIG. 6. With this configuration, a diameter of unsupported area of the diaphragm 34 is reduced and therefore the movement of the diaphragm 34 is reduced. As a result, the electrical shortage is less likely to be produced.

Figure 7:
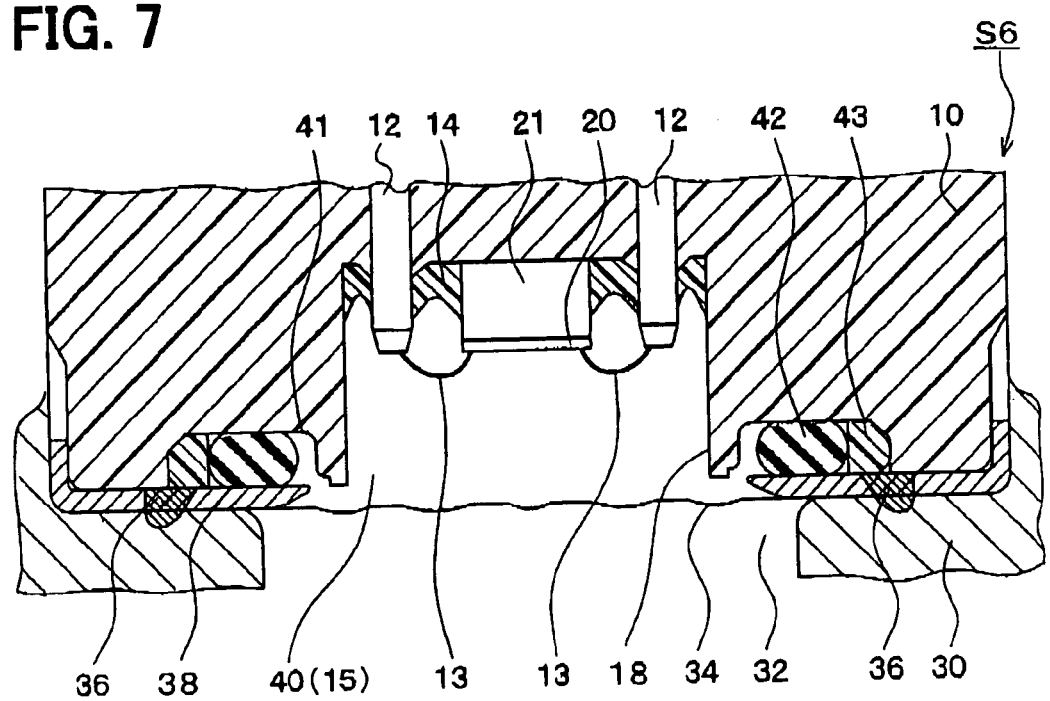
FIG. 7 is a cross-sectional view around a pressure sensing chamber of a pressure sensor according to a modified embodiment of the present invention.

The recess 11 may be provided with a larger depth as a recess 18 of a pressure sensor S6 shown in FIG. 7 so that a distance between the wires 13 and the diaphragm 34 are increased. For instance, the distance may be two to three times larger than that of the pressure sensor shown in FIG. 8. With this configuration, the sensor chip 20 and the wires 13 can be arrange at a position that the diaphragm 34 does not touch the sensor chip 20 and the wires 13 even when the diaphragm 34 moves to its limit toward the sensor chip 20.

The liquid confined in the chamber 40 is not limited to the oil 15. Any type of liquid can be used as long as it has electrical insulation and functions as a pressure transmitting member. The sensor chip 20 is not limited to the diaphragm type semiconductor sensor chip. Any device that outputs electrical signals according to levels of pressure received from the liquid can be used.

Solder or lead member can be used for electrical connection between the sensor chip 20 and the terminals 12. The pressure sensors S3, S4 can be combined with the pressure sensor S1 or S2 so that the movement of the diaphragm 34 can be restricted and electrical isolation among the sensor chip 20, the wires 13, and the diaphragm 34 is provided.

What is claimed is:

1. A pressure sensor comprising;
    a case having a pressure sensing chamber;
    a liquid confined in the pressure sensing chamber;
    a pressure receiving metal diaphragm that has contact with the liquid and seals the pressure sensing chamber; and
    a pressure sensing element to which a connecting member for electrical connection is attached, and arranged in the pressure sensing chamber in a position that pressure from the liquid is receivable;
    an O-ring arranged around an edge of the pressure receiving diaphragm and the pressure sensing chamber between the pressure receiving diaphragm and the case; and
    a welding ring arranged around the edge of the pressure receiving diaphragm and the pressure sensing chamber between the pressure receiving diaphragm and the case more adjacent to the pressure receiving diaphragm than the O-ring, wherein
    the pressure receiving diaphragm is fixed to the case via the O-ring and the welding ring, and
    the welding ring has a hole formed such that an inner portion of the welding ring is placed between the pressure receiving diaphragm and at least one of the pressure sensing element and the connecting member in a longitudinal direction in the pressure sensing chamber.

2. The pressure sensor according to claim 1, wherein the hole of the welding ring is formed with a diameter smaller than a diameter of the pressure sensing chamber such that an inner portion of the welding ring is placed between the pressure sensing element, the connecting member, and the pressure receiving diaphragm in the pressure sensing chamber.

3. The pressure sensor according to claim 1, wherein the welding ring has a mesh screen that covers the hole.

4. The pressure sensor according to claim 1, further comprising an insulator film having electrical insulation and formed on a surface of the pressure receiving diaphragm on a pressure sensing chamber side.

5. The pressure sensor according to claim 1, further comprising insulator films having electrical insulation and formed on surfaces of the pressure sensing element and the connecting member.

6. The pressure sensor according to claim 1, further comprising a terminal in the case, wherein:
    the terminal connects the pressure sensing element to an external device;
    the pressure sensing device and the terminal are electrically connected with each other via a wire inside the pressure sensing chamber; and
    the wire is the connecting member.

7. A pressure sensor comprising;
    a case having a pressure sensing chamber;
    a liquid confined in the pressure sensing chamber;
    a pressure receiving metal diaphragm that has contact with the liquid and seals the pressure sensing chamber; and
    a pressure sensing element to which a connecting member for electrical connection is attached, and arranged in the pressure sensing chamber in a position that pressure from the liquid is receivable;
    an O-ring arranged around an edge of the pressure receiving diaphragm and the pressure sensing chamber between the pressure receiving diaphragm and the case; and a welding ring arranged around the edge of the pressure receiving diaphragm and the pressure sensing chamber between the pressure receiving diaphragm and the case more adjacent to the pressure receiving diaphragm than the O-ring, wherein the pressure receiving diaphragm is fixed to the case via the O-ring and the welding ring, and the pressure receiving diaphragm has an insulator film having electrical insulation on a surface thereof on a pressure sensing chamber side, the electrical insulation being exposed to the pressure sensing chamber.

8. The pressure sensor according to claim 7, further comprising a terminal in the case, wherein:

the terminal connects the pressure sensing element to an external device;

the pressure sensing device and the terminal are electrically connected with each other via a wire inside the pressure sensing chamber; and the wire is the connecting member.

* * * * *